April 29, 1958 N. N. BUDISH 2,832,192
CONVERTIBLE TURBO-JET AND RAMJET ENGINE
Filed Oct. 15, 1953 2 Sheets-Sheet 1
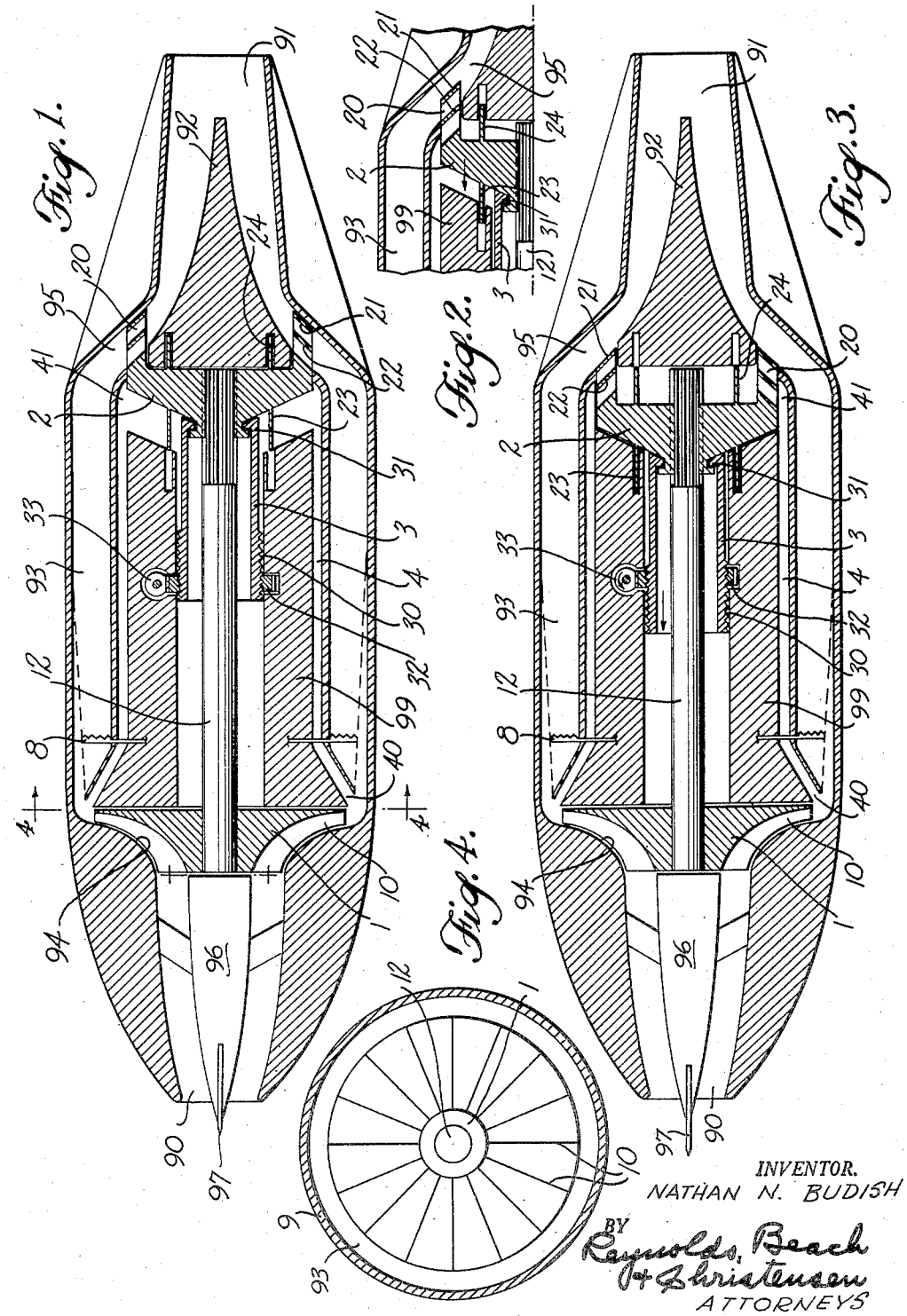
INVENTOR.
NATHAN N. BUDISH
BY Reynolds, Beach
& Christensen
ATTORNEYS

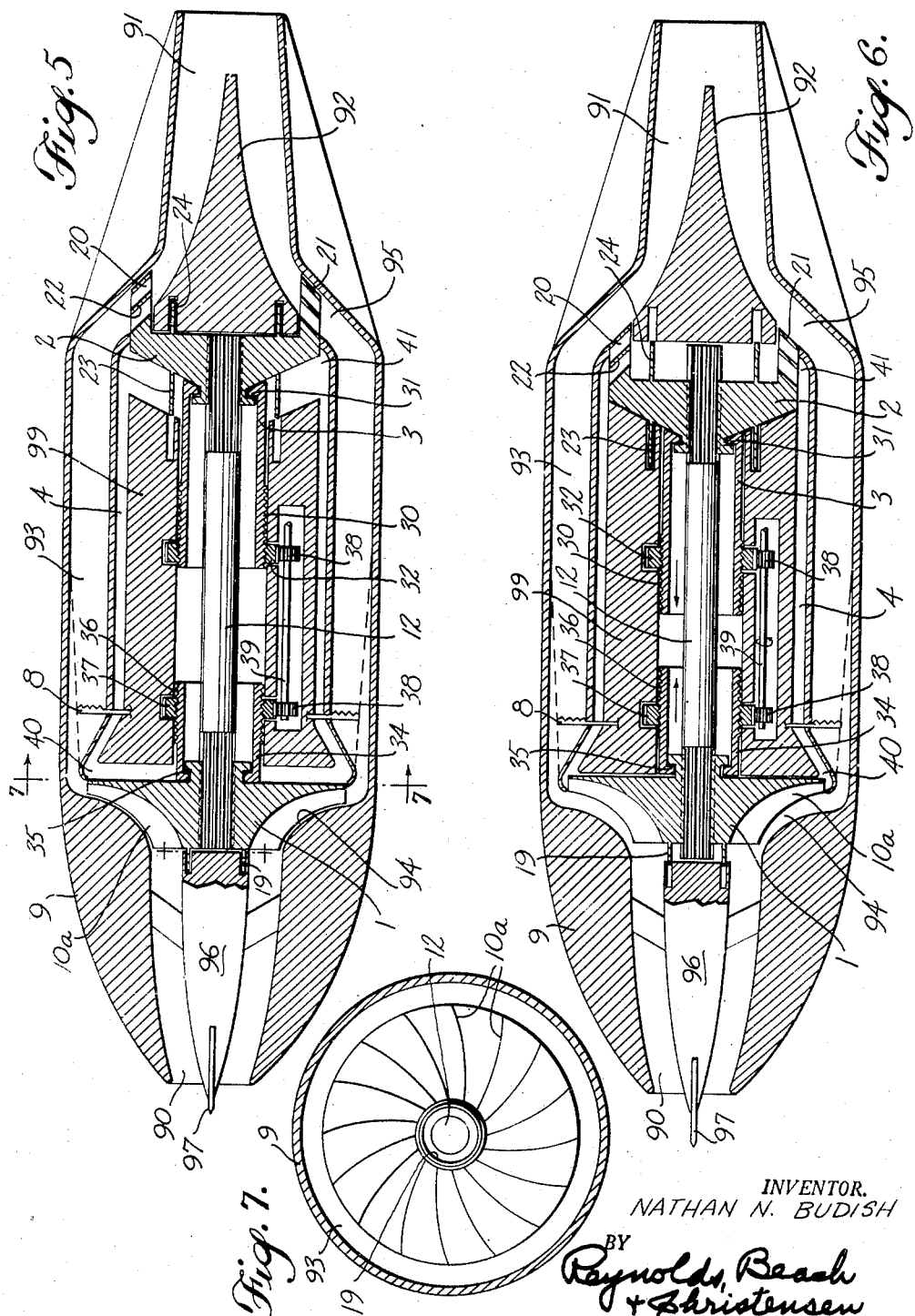

United States Patent Office 2,832,192
Patented Apr. 29, 1958

2,832,192

CONVERTIBLE TURBO-JET AND RAMJET ENGINE

Nathan N. Budish, Seattle, Wash., assignor to Boeing Airplane Company, Seattle, Wash., a corporation of Delaware Application October 15, 1953, Serial No. 386,194

11 Claims. (Cl. 60—35.6)

This invention pertains to a continuous combustion jet engine for use in airplanes, having in part the characteristics of a turbojet engine, and having in part or alternatively, under different conditions, the characteristics of a ramjet engine. The invention is embodied in an engine, of the general class indicated, which is convertible in flight from a turbojet into a ramjet engine, and vice versa.

Power plants of the general type to which this invention pertains, which may be termed air-breathing power plants, are generally designed to fall into some one, only, of four categories, namely (I) subsonic turbojets for cruising at subsonic speeds; (II) subsonic turbojets plus afterburners for supersonic dash; (III) supersonic turbojets for supersonic cruise at Mach numbers less than 2.5 approximately; (IV) ramjets for supersonic cruise at Mach numbers greater than 2.5 approximately. Subsonic turbojets of group I tend to be marginal as far as take-off thrust is concerned, wherefore thrust augmentation devices such as water injection or rocket assist are used for take-off. They are wholly unsuited to sustained supersonic flight. Class II power plants tend to have rather high specific fuel consumptions, but generally provide an excess of thrust for take-off. They are not suitable, however, for cruising at supersonic speeds. Class III supersonic turbojets are designed specifically for supersonic flight operation, but as such they tend to have higher specific fuel consumptions than the corresponding subsonic design of turbojets, even though rangewise the supersonic airplane may be more efficient due to the greater cruise Mach number. However, a limit of approximately Mach 2.5 is set on supersonic turbojets of the third category, because of engine temperature restrictions. The compressor exit temperatures become so high that very little combustion temperature rise can be tolerated. This temperature limit may be increased somewhat in future turbojet designs by new alloy materials for turbine wheels, by the use of ceramic materials and by basic design improvements. Even so, a Mach number limit will be reached at which the turbojet power plant is no longer practical, and for higher Mach numbers only a ramjet of the fourth category can serve the function of producing thrust during cruising. With a suitable airplane configuration for flight below approximately 100,000 feet altitude and Mach number range of approximately 2 to 5, the ramjet appears to be a very efficient power plant.

It is the general object of this invention to provide a power plant design which in a suitably designed airplane is capable of (a) conventional take-off and landing performance, (b) conventional subsonic cruise performance, (c) wide range of supersonic cruise performance. More particularly, it is the object of this invention to provide a power plant for airplanes, capable of high supersonic speeds, which will perform fairly efficiently as a turbojet engine in the subsonic airspeed region, very efficiently as a turbojet engine in the supersonic region below Mach 2.5, and which will function as a ramjet at Mach numbers greater than 2.5.

It is also an object of this invention to provide an engine having the characteristics and capabilities indicated, wherein the area of the turbine blades at least, and possibly also of the compressor blades, which is exposed to impingement of the combustion gas (or of the air, as the case may be) may be varied, whereby at higher Mach numbers to lessen the obstruction to free flow through the corresponding passage within the engine, and in turn by lessening the extent to which the turbine induces and controls rotation of the compressor to lessen the interruption of free air flow at the higher Mach numbers past the compressor. In the practical embodiment shown, this may be accomplished by retracting at least the turbine blades from the gas flow passage within the engine partially or completely, and preferably by similarly retracting the compressor blades from the air flow passage, coincidentally with such retraction of the turbine blades, from their positions of projection into the respective passages such as are best suited for operation at lower Mach numbers, and conversely, by projecting the retracted blades again into the passage or passages when operation is to be resumed at the lower Mach numbers. Thereby the engine with no further change in design may operate alternatively as a turbojet engine or as a ramjet engine. Further, it is an object to provide an engine of this sort in which the change from one type to the other may occur gradually, partially, or in stages, so that at times the engine may be operating in part as a turbojet engine and in part as a ramjet engine.

It is a further object to provide an engine of the character indicated in which provision is made for adequate cooling of the compressor and of the turbine, especially during ramjet operation.

With such objects in mind and others as will appear more clearly hereinafter, the present invention comprises the novel engine shown in two representative forms in the accompanying drawings, and such as will be described more fully hereinafter and defined by the claims which terminate this specification.

All the figures in the accompanying drawing are diagrammatic in character, showing only so much of each engine and the components thereof as is necessary to a full understanding of the present invention. Applicant considers the showing as illustrative of the principles of the invention, rather than as binding its embodiment to any specific form, details, or relationships.

Figure 1 is an axial sectional view through the engine, showing parts in position for turbojet operation, and Figure 2 is a detail sectional view similar to Figure 1 but showing the turbine blades partially retracted, and Figure 3 is a view similar to Figure 1, but showing the turbine blades fully retracted, for full ramjet operation.

Figure 4 is a transverse sectional view, looking rearwardly at the compressor blades, the line of section being generally indicated by the line 4—4 in Figure 1.

Figure 5 is a view similar to Figure 1, showing an alternative form of engine in which in addition to the turbine blades the compressor blades also are retractable, and with the parts in position for turbojet operation, and Figure 6 is a view similar to Figure 5 of the same alternative form, but showing parts fully retracted for ramjet operation.

Figure 7 is a transverse sectional view similar to Figure 4, but showing the compressor blades nonradially disposed. The line of section is indicated generally at 7—7 in Figure 5, although it is not to be taken that the spirally shaped blades of Figure 7 are necessarily incorporated in or constitute an essential part of the arrangement shown in Figures 5 and 6.

The basic design of the engine is similar to conventional engines intended for high speed flight. For example, the engine includes a shell 9 of suitable exterior shape, open at its forward end, as indicated at 90, for intake of air, open at its rear end, as indicated at 91, for exit of exhaust gases, and constituting an exhaust gas nozzle in conjunction with the nozzle cone 92, and being formed intermediate the air intake at 90 and the gas exit opening at 91 with a generally annularly arranged passage for air and gas. Burners 8, angularly spaced about the engine, discharge fuel into this annular passageway, constituting of the central part thereof, indicated at 93, a combustion chamber or chambers. It is immaterial whether the chambers be of the can type, that is, separate individual chambers, or of the annular type technically so designated, in which there are no divisions. The combustion chamber will be referred to hereinafter as annular because of its arrangement about the engine and just within the outer shell, and whether or not it is divided into individual chambers, and this term "annular" is to be understood as inclusive of both, and is not to be taken in the purely technical sense.

Intermediate the air intake at 90 and the combustion chamber at 93, the air passage flares outwardly in all radial directions to define an airflow passage 94. In similar fashion, intermediate the rear end of the combustion chamber 93 and the jet nozzle 91, a portion of the passageway converges inwardly and rearwardly to constitute a gas flow passage 95.

As an optional feature the island 96 within the air intake opening 90 may be provided with a shock plate 97, and this may be projectable and retractable, by means not shown nor necessary to an understanding of the present invention, and in this case it would be projected for supersonic cruising; compare Figures 1 and 3, and 5 and 6.

Within the air passage 94 there is located a compressor 1, the blades 10 whereof are more or less radially disposed. They may be precisely radial, as shown in Figure 4, or as shown in Figure 7, they may be somewhat spirally disposed. This compressor 1 is fast to a shaft 12, by means of which it can be rotated from the turbine wheel 2, this turbine wheel being also splined or otherwise connected for rotating the shaft 12.

The turbine wheel is preferably formed with its blades 20 in the form of an annular skirt projecting rearwardly from its periphery, rather than projecting radially from that periphery. In this form they project rearwardly when operating as a turbojet, into the gas flow passage 95, and are there subject to impingement by the exhaust gases passing from the combustion chamber 93 into the jet nozzle 91. Preferably, and for a reason which will shortly appear, the outer tips of the blades are joined by an annular peripheral ring 21, and the blades are similarly joined by another annular divider ring 22 intermediate the root and the tip of the several blades. These ring members 21 and 22 are oriented generally parallel to the walls of the gas flow passage 95, and in particular are formed in such manner that when the turbine wheel is retracted forwardly, either the divider ring 22 or the peripheral ring 21 will coincide with the adjacent portions of the inner wall of the gas flow passage and so will substantially close the aperture therein through which these blades are retracted.

As has been indicated, at least the turbine wheel and its blades 20 are retractable forwardly, and either in a manner to effect partial retraction of the blades or complete retraction thereof. The means for accomplishing retraction are diagrammatically shown, and any means suitable to the purpose may be employed. The means illustrated herein in Figures 1, 2 and 3 comprise a retractor sleeve 3 interengaged with the turbine wheel 2 as indicated at 31, in such manner that the turbine wheel may rotate relative to the sleeve but will be drawn in either axial sense by corresponding movement of that retractor sleeve 3. This sleeve 3 is threaded, as indicated at 30, and a worm gear 32 is threaded upon the threads at 30 and effects axial movement of the sleeve 3 in one axial sense or the other, depending upon the sense of rotation of the worm pinion 33. The turbine wheel 2 is splined upon the shaft 12, and so effects rotation of the shaft so long as the turbine wheel is rotating, in any axially retracted or projected position of the turbine's blades. Flame guards 23 and 24 carried by the turbine wheel move into or out of matching recesses in the engine body 99 and the nozzle cone 92, respectively. Their function is to prevent access of hot gases to the interior portions of the engine, particularly to the turbine retracting mechanism.

Additionally it is preferred to provide a cooling air passage 4, separate from the airflow passage for combustion or from the gas flow passage, for positive cooling of the turbine blades. This cooling air passage 4 has its forward end opening at 40 adjacent the delivery from the compressor blades 10, and at its rear end terminates at 41 adjacent the retracted positions of the turbine blades. When the turbine blades are projected into the gas flow passage 95, the turbine wheel blocks the cooling air passage 4 to a large extent, but when the turbine blades are retracted, even partially as shown in Figure 2, air from the compressor, passing through the cooling air passage 4, blows over and past the retracted blades, cooling them.

It is preferred that retraction be effected through definite positions or by distinct stages; one such position is shown in Figure 2, and here the divider ring 22 forms a smooth continuation of the inner wall of the gas flow passage 95, whereas the portion of the blades 20 outwardly thereof remain still projected into the gas flow passage. The engine under such conditions operates partly as a turbojet and partly as a ramjet.

It is preferred with this construction that the blades 10 of the compressor be radial, and that this be a centrifugal compressor. When such is the case it is not necessary to retract the compressor 1 from the airflow passage 94, for if the blades 10 of the compressor do not rotate, and they will not as long as the turbine is not rotating, they offer no appreciable obstruction to the free flow of air from the intake at 90 into the combustion chamber 93. In this condition neither is there any obstruction at 40 to the entrance of air into the cooling air passage at 4. With the turbine blades only partially retracted, the engine will operate, as has been said, in part as a turbojet engine and in part as a ramjet engine. This condition would be suitable for operation at speeds in the vicinity of Mach 2. At the higher speeds, however, the turbine blades would be fully retracted, as in Figure 3, and in this condition the engine will function as a simple ramjet engine. Such conditions would be suitable for operation from a speed of approximately Mach 2 or 2.5 on upward.

It may be preferred, however, to effect retraction of the compressor blades also from the airflow passage, and this would be particularly desirable in situations where, as in Figure 7, the compressor blades 10a are not strictly radially directed, but are spirally arranged. It may be desirable to retract the compressor blades even though these blades are radially arranged, so that it is not only when the compressor blades are spirally arranged that they are retractable, but such retraction may be effected under circumstances when they are radially disposed as well. Conveniently, too, the retraction of the compressor blades is accomplished at the same time and by the same means as those which effect retraction of the turbine blades.

Such an arrangement is shown in Figures 5 and 6. Herein the compressor wheel 1 is splined upon the shaft 12 which is common to it and to the turbine wheel, and a retractor sleeve 34 is interengaged with the compressor wheel 1, as indicated at 35, to permit free rotation of the compressor wheel but to effect axial movement of the compressor wheel conjointly with the retractor sleeve 34. The latter is threaded at 36 and a nut 37 is threaded thereon, in the same manner as the nut 32 is received upon the threads 30 of the retractor sleeve 3. By forming the nuts 37 and 32 with gear teeth, pinions 38 upon the common shaft 39 will effect rotation of the nuts and consequent axial movement of both the retractor sleeves when the shaft 39 is rotated. One of the nuts 32, 37 will be right-handed, and the other left-handed, and this will accomplish conjoint axial retraction inwardly or projection outwardly, in the manner indicated by the arrows in Figure 6. Brake means, not shown, hold the sleeves 3 and 34 against rotation except when bodily shifting of the wheels 2 and 1 is desired. Guards 19 on the compressor wheel 1 will serve the same function as the flame guards 23 and 24.

In this form of the device, even if it be assumed that the blades 10a of the compressor are spirally arranged, the compressor wheel 1 may still continue to rotate by the impingement of the relative air and notwithstanding the cessation of rotation of the turbine wheel. This rotation of the compressor wheel will be at a much lesser rate than when it is driven by the turbine, and yet will be sufficient to direct air into the cooling air passage 4, the more so as the retraction of the compressor wheel 1 leaves the tips of its blades 10a in position to deliver into the inlet 40 of the cooling air passage. The compressor blades are not retracted completely out of the airflow passage, but are so withdrawn as to offer substantially no obstruction to free passage of air through that airflow passage.

There may be changes required in the design of the engine, such as a better cooling of all parts, especially for ramjet operation, and possible adjustment of the nozzle cone 92 under different conditions. These, however, are subsidiary details which constitute no part of the present invention.

It appears probable that in ramjet operation stoichiometric fuel-air ratios may be approached, since the exhaust gas temperatures are no longer limited by the characteristics of the turbine wheel. The hot gases flow through the exit nozzle unrestricted by turbine blades.

I claim as my invention:

1. A continuous combustion aeronautical jet engine comprising an enclosing shell open at its front end for intake of air, and formed at its rear end as a jet nozzle for discharge of combustion products, means fixedly positioned within the shell, defining a combustion chamber space annularly about the shell intermediate the air intake opening and the jet nozzle, and defining also an air flow passage annularly disposed for communication between the air intake opening and the combustion chamber space, and an unchanging area annularly disposed gas flow passage extending in the axial direction from the combustion chamber space to the jet nozzle, a bladed compressor having its blades located in the air flow passage and rotatable to compress the entering air, burners fixed within the combustion chamber space for delivery of fuel into the air flowing therethrough, a bladed gas turbine mounted within the shell for bodily shifting in the axial direction between two positions, in a first position whereof its blades project within the gas flow passage for impingement by the combustion gases flowing through the gas flow passage, and in a second position whereof its blades are withdrawn from and leave such gas flow passage unobstructed, for unimpeded outflow of the combustion gases by the same path, drive means interconnecting said turbine and said compressor to rotate the latter, and retracting means operatively connected to said turbine to shift it between such two positions.

2. A jet engine as set forth in claim 1, wherein the compressor's blades are radially disposed, and cease rotating as a result of air flow impingement upon complete retraction of the turbine's blades.

3. A jet engine as set forth in claim 1, characterized in that the retracting means is also operatively connected to the compressor, for retraction of the latter's blades from the air flow passage upon retraction of the turbine's blades from the gas flow passage.

4. A jet engine as set forth in claim 1, wherein the compressor's blades are spirally disposed, and characterized in that the retracting means is also operatively connected to the compressor, for retraction of the latter's blades from the air flow passage simultaneously with retraction of the turbine's blades from the gas flow passage.

5. A jet engine as set forth in claim 1, wherein the turbine is formed with a rotative wheel and with its blades directed rearwardly from the periphery of said wheel in an annular ring, and wherein the gas flow passage includes a radially inwardly converging portion whereinto said blades project, and characterized in that the turbine wheel is retractable in the axial direction to withdraw said blades at least partially from that portion of the gas flow passage.

6. A jet engine as set forth in claim 5, including a divider ring located intermediate the front and rear ends of the turbine's blades, and oriented to substantially coincide with the wall of the converging portion of the gas flow passage when the turbine and its blades are in partially retracted but operative position.

7. A jet engine as set forth in claim 5, including a terminal ring joining the outer ends of the turbine's blades, and oriented to substantially coincide with the wall of the converging portion of the gas flow passage and to close the aperture in such wall whereinto the turbine blades are retracted, during full retraction thereof.

8. A jet engine as in claim 1, characterized in that the means which defines the combustion chamber space and the air flow and gas flow passages is formed with an annular cooling air passage extending from the compressor's location, and open to receive air therefrom, to the location of the turbine's blades, separate from the normal air flow passage through the combustion chamber, the outlet from said cooling air passage being at least partially blocked by the turbine when the latter's blades are fully extended, but being at least partly opened by retraction thereof, to establish a flow of cooling air past the retracted turbine's blades.

9. A jet engine as in claim 8, including ring means formed on the turbine's blades and positioned to close the aperture in the gas flow passage whereinto the blades are retracted, and to separate the cooling air passage from such gas flow passage, in each retracted position of those blades.

10. A jet engine as set forth in claim 1, wherein the compressor's blades are spirally disposed, and the compressor is mounted for axially rearward retaction out of the direct airflow through the air flow passage but when so retracted remains facing forwardly into the airflow, for continued rotation at a reduced rate, and characterized in that the retracting means is also operatively connected to the compressor, for bodily retraction of the latter rearwardly as specified, during retraction of the turbine's blades, said means which defines the combustion chamber space and the air flow and gas flow passages being formed with an annular cooling air passage separate from the normal air flow passage through the combustion chamber, said cooling air passage having an opening at its front end located to receive air from the retracted compressor, and an opening at its rear end at a location to deliver air past the retracted turbine blades, to cool the latter.

11. A continuous combustion air-breathing engine for propulsion over a wide speed range, including higher and lower Mach numbers, comprising an enclosing shell open at its front end for intake of air, and formed at its rear end as a jet nozzle for discharge of combustion products, means fixedly positioned within the shell to define an annularly disposed combustion chamber space intermediate its front and rear openings, and to define an annular air flow passage for leading intake air from the air intake opening to the combustion chamber, and also a gas flow pasage for leading all gases of combustion by a fixed path from the combustion chamber space to the jet nozzle, burner means arranged to deliver fuel into said combustion chamber space for admixture with and combustion by means of air flowing therethrough, a bladed compressor located within said shell and having its blades located, during operation at lower Mach numbers, in the air flow passage and rotatable to compress the entering air, a bladed gas turbine located within said shell and having its blades loacted, also during operation at lower Mach numbers, in the annular gas flow passage for rotation under the impingement of the gas flow, drive means interconnecting said turbine and said compressor to rotate the latter, and means operatively connected to the turbine to shift the latter bodily within the shell between an operative position wherein its blades are exposed to impingement and rotation by the combustion gases as they flow through their fixed path, and a retracted position wherein its blades are withdrawn from that fixed path, for unobstructed gas flow by the same path at higher Mach numbers, and by the consequent termination of turbine rotation to terminate rotation of the compressor and its interruption to free air flow through the air flow pasage, during operation at such higher Mach numbers.

References Cited in the file of this patent

UNITED STATES PATENTS

| | | |
|---|---|---|
| 1,167,018 | Pyle | Jan. 4, 1916 |
| 1,627,294 | Nydqvist | May 3, 1927 |
| 1,809,271 | Goddard | June 9, 1931 |
| 2,397,998 | Goddard | Apr. 9, 1946 |
| 2,507,657 | Wiessler | May 16, 1950 |
| 2,587,649 | Pope | Mar. 4, 1952 |
| 2,610,465 | Imbert et al. | Sept. 16, 1952 |
| 2,735,499 | Ehlers | Feb. 21, 1956 |

FOREIGN PATENTS

| | | |
|---|---|---|
| 244,980 | Switzerland | June 16, 1947 |